United States Patent
Schaffer et al.

(10) Patent No.: US 6,601,053 B1
(45) Date of Patent: Jul. 29, 2003

(54) OPTIMIZED ARTIFICIAL NEURAL NETWORKS

(75) Inventors: J. David Schaffer, Wappingers Falls, NY (US); Larry J. Eshelman, Ossining, NY (US); Richard A. Caruana, Ridgefield, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/578,428

(22) Filed: May 25, 2000

Related U.S. Application Data

(63) Continuation of application No. 08/484,695, filed on Jun. 7, 1995, now abandoned, which is a continuation of application No. 08/212,373, filed on Mar. 10, 1994, now abandoned, which is a continuation of application No. 07/714,320, filed on Jun. 10, 1991, now abandoned, which is a continuation of application No. 07/354,004, filed on May 19, 1989, now abandoned.

(51) Int. Cl.$^7$ ................................................. G06N 3/02
(52) U.S. Cl. ............................... 706/26; 706/4; 706/13; 706/15
(58) Field of Search ............................... 706/13, 26, 15, 706/20, 4

(56) References Cited

U.S. PATENT DOCUMENTS 5,140,530 A * 8/1992 Guha et al. .................... 706/13

OTHER PUBLICATIONS

Hassoun, Mohamad H., Fundamentals of Artificial Neural Networks, The MIT Press, Cambridge, MA, Mar. 27, 1995, pp. 210–218.*
Medsker, Larry R., Hybrid Intelligent Systems, Kluwer Academic Publishers, 1995, pp. 127–143.*
Goonatilake, Suran et al, Intelligent Hybrid Systems, John Wiley and Sons, Inc., 1995, pp. 85–104.*
Holland, John, Adaptation in Natural and Artificial Systems, The MIT Press, 1992, pp. 90–118.*
Rumelhart et al., "Learning Internal Representations by Error Propagation", Parallel Distributed Processing, vol. 1 (1986), pp. 319–362.
R.P. Lippmann, "An Introduction to Computing with Neural Nets", IEEE Assp Magazine, Apr. 1987, pp. 4–22.
D. Whitley, "Applying Genetic Algorithms to Neural Network Learning", Proc. $7^{th}$ Conf. Society of the Study of Artificial Intelligence and Simulation of Behavior, Apr. 1989, pp. 137–144.
Schaffer et al, "Using Generic Search to Eploit the Emergent Behavior of Nueral Networks", Physica D42, 1990, pp. 244–248.
Dolen et al., "Towards the Evolution of Symbols", Proc. $2^{nd}$ Int'l Conf. on Genetic Algorithms, Jul. 1987, pp. 123–131.
Hinton and Nowlan, "How Learning can Guide Evolution", Complex systems 1, 1987, pp. 495–502.
Dress et al., "A Darwinian Approach to Artificial Neural Networks", Proc. 1987 IEEE Systems, Man and Cybernetics Conf., 1987, pp. 572–577.
Smith et al., "Calibration of Neural Networks Using Genetic Algorithms, with Application to Optimal Path Planning", First Ann. workshop Space Operations, Automation an Robotics (SOAR 1987), Aug. 1987, pp. 519–526.
J. Holland et al., "Cognitive Systems based on Adaptive Algorithms", Cognitive Systems 1978, pp. 313–329.
H.J. Bremermann, "Optimization Through Evolution and Recombination", Dept. of Mathematics< University of California, Self–Storage Systems, 1962, pp. 93–106.

* cited by examiner

*Primary Examiner*—Wilbert L. Starks, Jr.
(74) *Attorney, Agent, or Firm*—Michael E. Belk

(57) ABSTRACT

Neural network architectures are represented by symbol strings. An initial population of networks is trained and evaluated. The strings representing the fittest networks are modified according to a genetic algorithm and the process is repeated until an optimized network is produced.

21 Claims, 4 Drawing Sheets

| $\eta$, | $\alpha$, | W, | F1, | N1, | F2, | N2, |
|---|---|---|---|---|---|---|
| ↓ | ↓ | ↓ | ↓ | ↓ | ↓ | ↓ |
| 11 | 01 | 11 | 1 | 0010 | 1 | 0110 |

```
1 1 0 1 1 1 1 0 : 1 0 1 1 0 1 1 1

0 1 1 1 0 1 0 1 : 0 1 0 1 0 1 1 0
```

OPTIMIZED ARTIFICIAL NEURAL NETWORKS

This a continuation of application Ser. No. 08/484,695, filed Jun. 7, 1995, now abandoned, which was a continuation of application Ser. No. 08/212,373, filed Mar. 10, 1994, now abandoned, which was a continuation of application Ser. No. 07/714,320, filed Jun. 10, 1991, now abandoned, which was a continuation of application Ser. No. 07/354,004, filed May 19, 1989 now abandoned.

BACKGROUND OF THE INVENTION

The present invention relates to artificial neural networks, and more particularly artificial neural networks having an architecture optimized by the use of a genetic algorithm.

The term artificial neural network is used herein to describe a highly connected network of artificial neurons. For simplicity, the modifier "artificial" will usually be omitted.

Artificial neurons themselves have simply described behavior. They are threshold circuits that receive input signals and which develop one or more output signals. The input-output relationship of a neuron is determined by a neuron activation or threshold function and the sum of the input signals. The activation function may be a simple step function, a sigmoid function or some other monotonically increasing function.

Neurons are combined in highly connected networks by signal transmission paths to form neural networks. The signal transmission paths have weights associated with them, so that a signal applied to a neuron has a signal strength equal to the product of the signal applied to the signal path and the weight of that signal path. Consequently the signals received by the neurons are weighted sums determined by the weight values of the signal transmission paths and the applied signal values.

The interconnectivity of the neurons in a neural network gives rise to behavior substantially more complex than that of individual neurons. This complex behavior is determined by which neurons have signal transmission paths connecting them, and the respective values of the signal transmission path weights. Desired network behavior can be obtained by the appropriate selection of network topology and weight values. The process of selecting weight values to obtain a particular network characteristic is called training. Different neural network architectures and techniques for training them are described in Parallel Distributed Processing, Vol. 1, D. E. Rumelhart, J. L. McClelland and P. R. Group, Editors, MIT Press, 1986.

Properly trained neural networks exhibit interesting and useful properties, such as pattern recognition functions. A neural network having the correct architecture and properly trained will possess the ability to generalize. For example, if an input signal is corrupted by noise, the application of the noisy input signal to a neural network trained to recognize the input signal will cause it to generate the appropriate output signal. Similarly, if the set of training signals has shared properties, the application of an input signal not belonging to the training set, but having the shared properties, will cause the network to generate the appropriate output signal. This ability to generalize has been a factor in the interest and tremendous activity in neural network research that is now going on.

Trained neural networks having an inappropriate architecture for a particular problem do not always correctly generalize after being trained. They can exhibit an "over training" condition in which the input signals used for training will cause the network to generate the appropriate output signals, but an input signal not used for training, and having a shared property with the training set, will not cause the appropriate output signal to be generated. The emergent property of generalization is lost by over training.

It is an object of the invention to optimize the architecture of a neural network so that over training will not occur, and yet have a network architecture such that the trained network will exhibit the desired emergent property.

SUMMARY OF THE INVENTION

According to the invention a neural network is defined, and its architecture is represented by a symbol string. A set of input-output pairs for the network is provided, and the input-output pairs are divided into a training set and an evaluation set. The initially defined network is trained with the training set, and then evaluated with the evaluation set. The best performing networks are selected.

The symbol strings representing the selected network architectures are modified according to a genetic algorithm to generate new symbol strings representing new neural network architectures. These new neural network architectures are then trained by the training set, evaluated by the evaluation set, and the best performing networks are again selected. Symbol strings representative of improved networks are again modified according to the genetic algorithm and the process is continued until a sufficiently optimized network architecture is realized.

BRIEF DESCRIPTION OF THE DRAWING

The method and network architecture according to the invention is more fully described below in conjunction with the accompanying drawing in which.

DETAILED DESCRIPTION OF THE INVENTION

Figure 1:
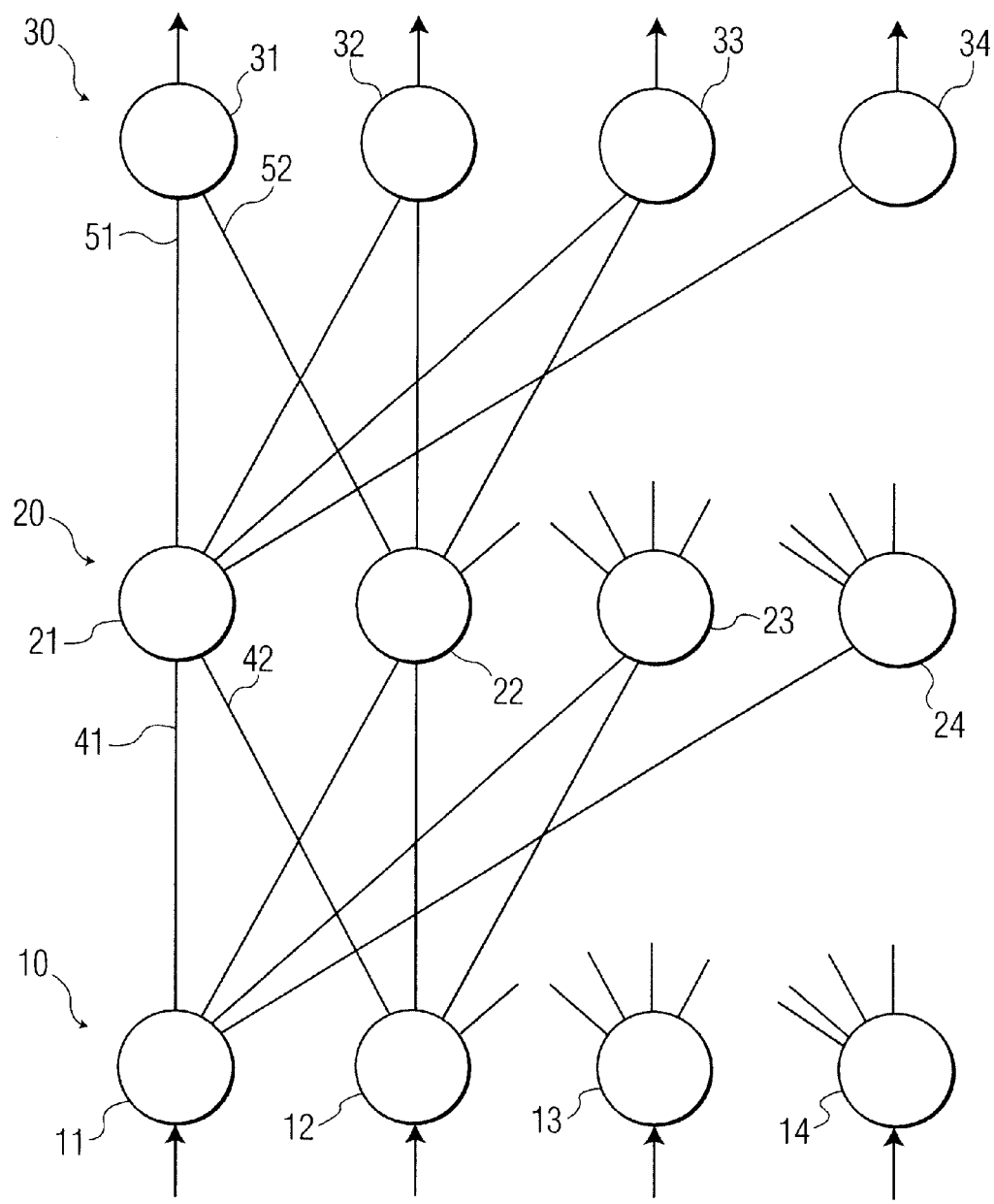
FIG. 1 illustrates the architecture of one kind of neural network having one hidden layer of neurons.

FIG. 1 illustrates a neural network of the feed forward type. The network is comprised of a layer 10 of input neurons 11–14, a hidden layer 20 of neurons 21–24 and a layer 30 of output neurons 31–34. In the network shown the input neurons are connected to the intermediate neurons by signal transmission paths 41, 42 . . . , and the intermediate neurons are connected to the output neuron by signal transmission paths 51, 52, . . . A more general form of feedforward network could also include signal transmission paths from the input neurons directly to the output neurons. For clarity, some of the possible signal transmission paths have been omitted from the drawing.

Initially, the neuron thresholds and the weights of the signal transmission paths are set to some random values. After training, the neuron thresholds and the path weights will have values such that the network will exhibit the performance for which it was trained.

The underlying theory of genetic algorithms is described in J. H. Holland, Adaptation in Natural and Artificial Systems, Univ. of Michigan Press, 1975. In carrying out the present invention, a symbol string is used to represent a neural network architecture. A genetic algorithm operates on the symbol strings, and by changing them it changes the architecture of the networks which they represent. The most frequently used symbols are binary, i.e. 0 and 1, but the algorithm is not restricted to binary symbols.

Figure 2:
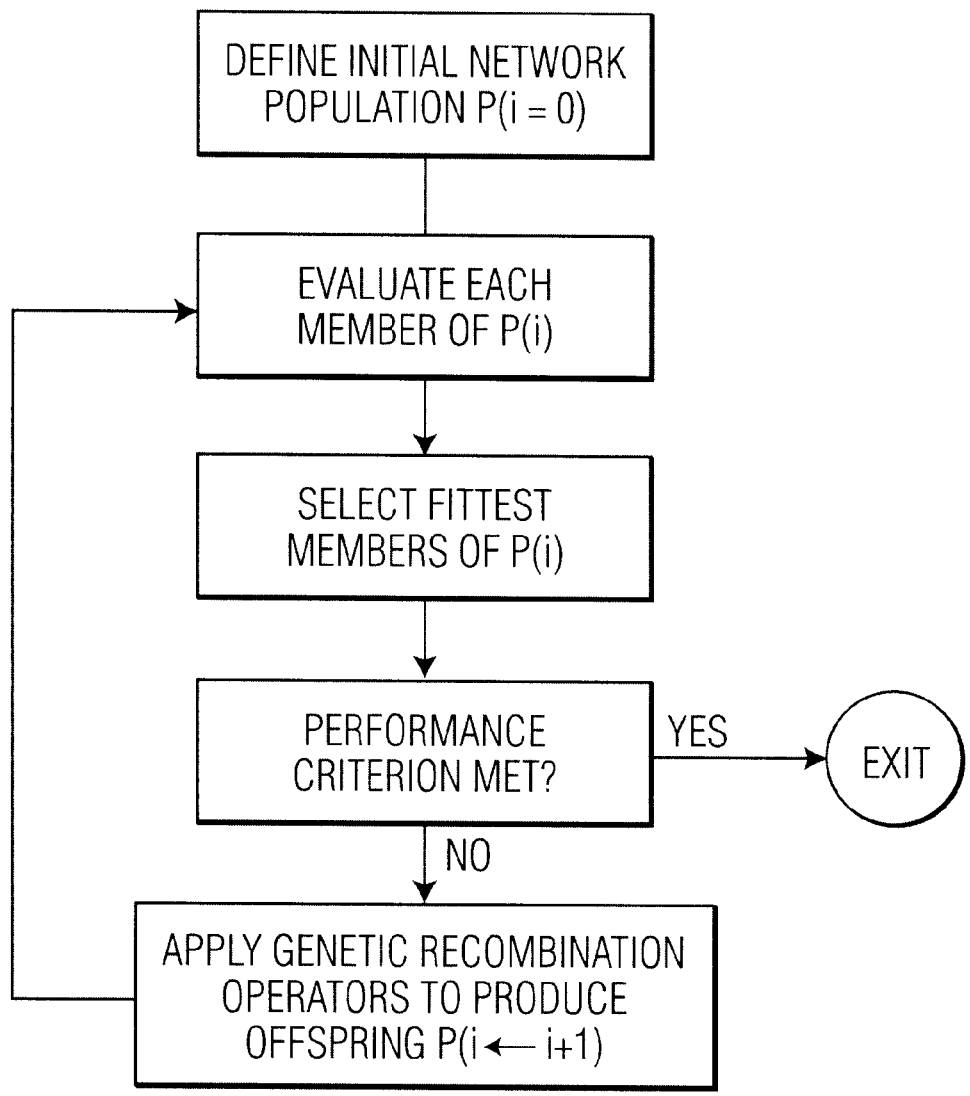
FIG. 2 illustrates the operation of a genetic algorithm.

FIG. 2 shows the steps in the genetic algorithm. An initial population P(i=0) of symbol strings representing an initial population of neural networks is defined. The population is evaluated according to some criterion and then the fittest members, i.e. those closest to the evaluation criterion, are selected. If the fitness of the selected members meet the criterion the algorithm stops. Otherwise, genetic recombination operators are applied to the symbol strings representing the population to create a new population P(i←i+1). The steps are repeated until the performance or selection criterion is met and the algorithm halts.

Figures 3A, 3B, 3C:
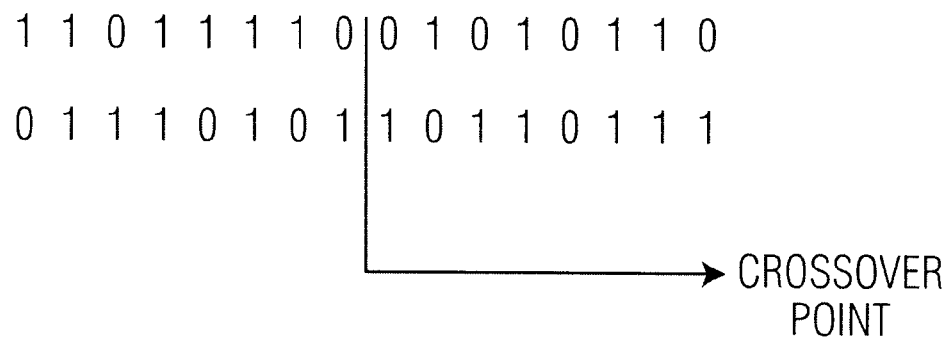
FIGS. 3A–3C show how a neural network architecture is represented by a symbol string and how a genetic algorithm recombination operator changes the symbol string.

FIGS. 3A–3C illustrate how a neural network architecture is represented by a symbol string, and how a recombination operator of the genetic algorithm operates on the strings to change the population of neural networks represented by the strings. The field of genetic algorithms has adopted biological terminology, and that terminology will be used in the following discussion.

In FIG. 3A various neural network parameters are mapped into a binary sequence. The entire binary sequence is referred to as a chromosome, and the particular substrings of the chromosome into which the network parameters are mapped are referred to as genes. The network parameters represented by the genes, and the mapping or representation used for each gene are discussed below in connection with the example given. For now, it is sufficient to understand that the chromosome represents a network having an architecture with the parameters (and the parameter values) represented by the genes. Different chromosomes represent different network architectures.

FIG. 3B illustrates a pair of chromosomes to which the genetic recombination operator will be applied. These two chromosomes are referred to as parents, and each represents a different network architecture.

An arbitrary position along the two chromosome strings called the crossover point is selected. The parent chromosomes are severed at the crossover point, and the resulting substrings are recombined in the following manner. The first substring of the first parent chromosome and the second substring of the second parent chromosome are combined to form a new chromosome, called an offspring. Likewise the first substring of the second parent chromosome and the second substring of the first parent chromosome are combined to form another offspring.

The offspring chromosomes are shown in FIG. 3C. The position where the substrings of the severed parent chromosomes were joined to form the offspring, i.e., the crossover point, is marked with a colon. The colon is not part of the chromosome string but is merely a marker to show where the parents were severed and the resulting substrings recombined to form the offspring. It will be appreciated that the repeated application of this recombination operator to a pair of chromosomes and their offspring will generate a tremendous number of different chromosomes and corresponding neural network architectures. Additionally, the genetic algorithm includes a mutation operator which with cause random bit changes in the chromosomes.

Figure 4:
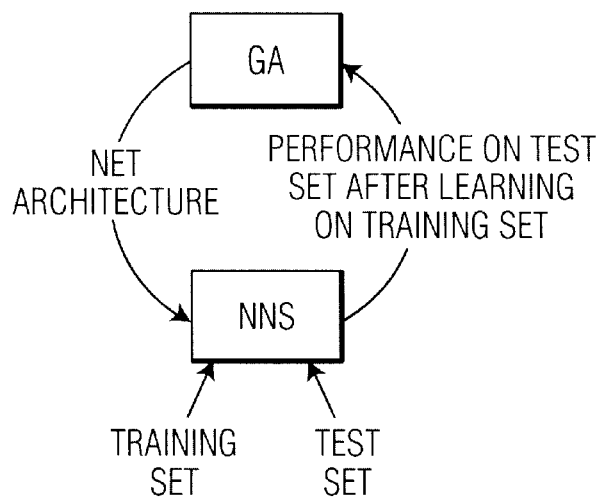
FIG. 4 illustrates the sequence of steps of the method according to the invention.

The method according to the invention can be understood with reference to FIG. 4. An initial population of networks is trained by a training set of input-output pairs, and the trained network is evaluated by an evaluation set of input-output pairs. Networks are selected for reproduction stochastically according to their performance evaluation relative to the population average. The chromosomes representing the network architectures of the selected networks are then modified by the genetic algorithm to create offspring representing new network architectures, and networks having the new architectures. The networks having the new architecture are then trained and evaluated. The best performing networks are again modified according to the genetic algorithm, and the process is continued until some specified performance criteria is met.

Example

An example of the invention was carried out by digital computer simulation. The task to be learned by the neural network was a pattern discrimination learning task called the minimum interesting coding problem. The input to the neural network was four binary signals in which the first two are noise having no relation to the output pattern. The next two represented a binary power-of-two coded integer and the output signals were to be the Gray coding of the input signal.

Network training was by the back propagation see Parallel Distributed Processing, Vo. 1, supra. pgs. 318–362. The network architecture was represented by a sixteen bit binary string, as shown in FIG. 3A. The first two bits represented the back propagation learning rate ($\eta$); the next two the back propagation momentum ($\alpha$); and the next two, the range of initial path weights (w). Two sets of five bits followed, each for representing a hidden layer. Flag bit F1 indicates whether the first hidden layer is present, and the remaining four bits N1 represented the number of neurons in that layer. Similarly, flag bit F2 indicates whether the second hidden layer is present, and the next four bits represent the number of neurons N2 in the second hidden layer. Thus, the representation could produce nets as large as having two hidden layers of sixteen neurons each and as small as no hidden layers. The particular representations used for the network parameters are as follows. Learning rate $\eta = \frac{1}{2}^n$, where n=1+ gray code value of the chromosome=1, 2, 3, 4. Thus, n=(0.5, 0.25, 0.125, 0.0625). Momentum $\alpha = (1-(n/10))$, where n=1+ gray code value of chromosomes=1, 2, 3, 4. Thus $\alpha=(0.9, 0.8, 0.7, 0.6)$. Weight $W = \frac{2}{2}^n$, where n=1+ gray code value of the chromosome=1, 2, 3, 4. Thus, W=(1.0, 0.5, 0.25, 0.125). Alternatively $W = \frac{2}{2}^n$—constant. The activation function of the neurons was a simple sigmoid function and is not critical. The number of input nodes was fixed at four and the number of output nodes was fixed at two, in order to match the problem.

The input-output pairs of the network are shown in the following Table I.

TABLE I

The Minimum Interesting Coding Problem

| input | output |
|---|---|
| 0000 | 00 |
| 1100 | 00 |
| 1001 | 01 |
| 1101 | 01 |
| 0010 | 11 |
| 0110 | 11 |
| 0011 | 10 |
| 1011 | 10 |

TABLE I-continued

The Minimum
Interesting Coding Problem

| input | output |
| --- | --- |
| 0100 | 00 |
| 1000 | 00 |
| 0001 | 01 |
| 0101 | 01 |
| 1010 | 11 |
| 1110 | 11 |
| 0111 | 10 |
| 1111 | 10 |

The method was applied using only the first eight entries from Table I. One of the first eight entries of the table was chosen at random and reserved for the evaluation set. The remaining seven table entries were used for the training set, and the network was trained until either the sum of the squared error decreased to the preset value 0.10 or after a prespecified number (in the case of this example, 2,000) of exposures to a training pair and back propagation. Once a network was trained, the evaluation set of one input-output pair was applied to it and the mean square error was used as an estimate of its ability to generalize. The sets with the lowest mean square error were selected. The strings representing the selected network architectures were modified according to the genetic algorithm and the process was repeated.

Figure 5:
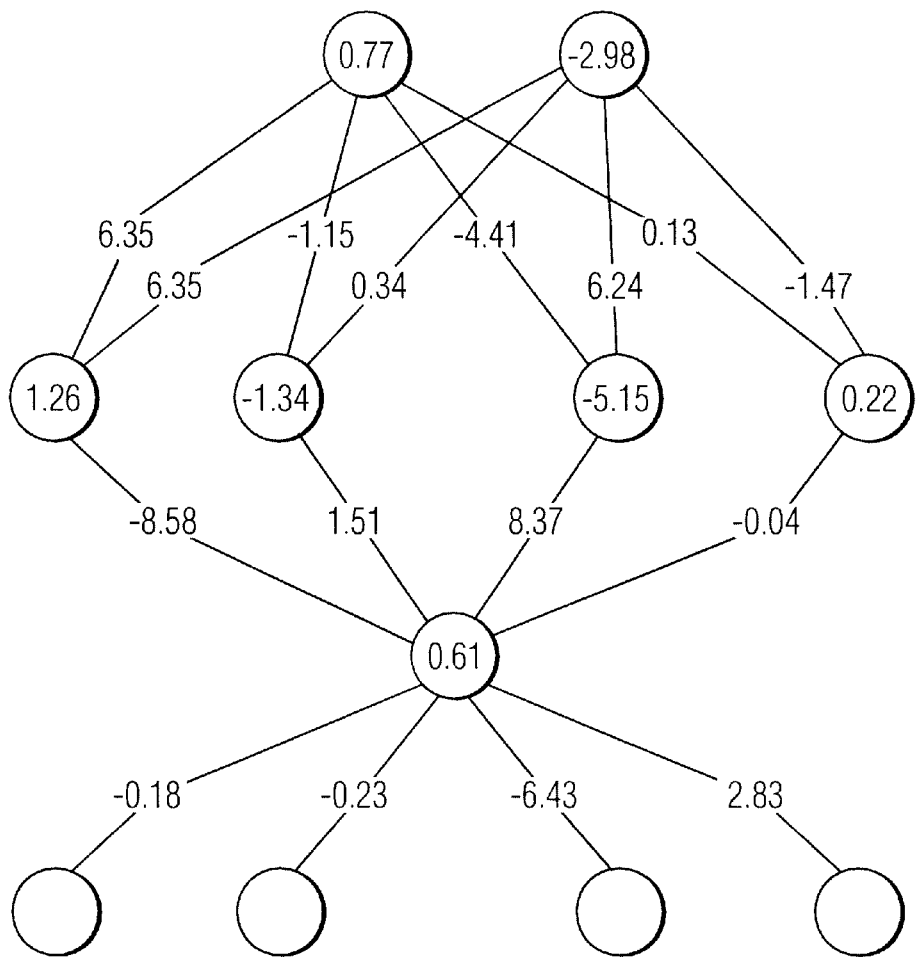
FIG. 5 illustrates an optimized neural network architecture realized according to the invention.

After producing and testing approximately 1,000 individual network architectures, the genetic algorithm's population had converged on several network properties. All of the final population of individual network architectures had two hidden layers, and the majority of them (19 of 30) had only a single neuron in the first intermediate layer. The most prevalent single architecture is shown in FIG. 5. The path weights and neuron thresholds for one example are shown in the drawing.

Initially, one would imagine that this architecture could not possibly solve the problem. There are four distinct classes of input patterns, and the network channels all input information into a single neuron. However, the activation level or threshold of the bottleneck neuron discriminates the four classes of input, and the low weights on the two noise input signals show that the network learned to ignore them. The connections above the bottleneck perform a recoding of the input.

Finally, the best architectures produced were repeatedly trained on all of the first eight table entries and then tested using the eight table entries they had never seen before. This was repeated fifty times and the total sum square error on the test set was determined, together with the number of times at least one of the eight test cases was incorrectly classified. For comparison, this procedure was also performed on the full network architecture with two hidden layers of sixteen neurons each, trained using back propagation learning only. These results are shown in the following Table II.

TABLE II

| criterion | full network | evolved network |
| --- | --- | --- |
| total error (mean) | 0.675 | 0.207 |
| total error (standard error) | 0.056 | 0.034 |
| error-free tests | 19/50 | 48/50 |

A t-test of the mean difference on total error is significant ($\alpha<0.001$). Clearly, the full network architecture exhibits over specificity to the training set, i.e. overtraining. It generalized poorly. On the other hand, the severe restriction of the architecture determined through the application of the genetic algorithm exhibits a substantially better performance and generalizes much better.

The preferred embodiment disclosed is a feedforward neural network. It is contemplated that the invention covers other types of optimized networks such as networks having feedback, networks without hidden neurons and other network configurations. Additionally, the genetic algorithm could use a more elaborate recombination operator such as one with more than one crossover point. Accordingly, the particular example given above should not be construed as limiting the scope of the invention which is defined by the following claims.

What is claimed is:

1. A method of producing optimized artificial neural networks, comprising:

providing a plurality of different neural network input-output sets including a plurality of training sets and an evaluation set;

providing a population of multiple symbol strings, the symbols of the strings representing parameters of neural network architecture and parameters of a learning method;

providing artificial neural networks for respective symbol strings of the population, based on the neural network architecture parameters;

training the artificial neural networks using the learning method depending on the training sets and learning method parameters;

evaluating the trained neural networks using the evaluation set to generate evaluations of the trained neural networks;

generating a further population of multiple symbol strings from the population of symbol strings using a genetic algorithm depending on the evaluations;

continuing the training, evaluation, and generating until a stopping criteria is met; and selecting one of the symbol strings for producing the optimized artificial neural network depending on the evaluations.

2. The method of claim 1 in which:

the generating includes assigning a fitness value to each of the plurality of symbol strings depending on the evaluations; and the genetic algorithm generates symbol strings depending on the fitness values.

3. The method of claim 1, wherein the neural networks include a layer of input neurons, a layer of output neurons, one or more hidden layers of neurons between the input layer and the output layer, a plurality of signal transmission paths interconnecting the neurons, the neurons multiplying signals received from the transmission paths by a weight for each path, the weight being adjusted during the training.

4. The method of claim 3, in which the neural network architectural parameters include: the number of layers of hidden neurons; and the number of neurons within each hidden layer of the network.

5. The method of claim 3, in which the network is a feed forward, wherein signals between neurons are only propagated in a direction toward the output layer; the learning method includes back propagation; and the learning method parameters include: learning rate, momentum, and initial path weight information.

6. The method of claim 5 wherein the training includes applying the inputs of a training set to a neural network; comparing the resulting output from the neural network to the outputs of the training set; and updating link weights within the neural network depending on results of the comparing.

7. The method of claim 1 in which the genetic algorithm selects less than all the symbol strings of the population for use in generating the further population, the selection depending on results of the evaluating.

8. The method of claim 1 wherein the genetic algorithm copies some of the symbols from one symbol string to another symbol string to generate the further population.

9. The method of claim 1 in which the genetic algorithm randomly changes values of symbols in the symbol strings of the population to generate the further population.

10. A neural network produced by the method of claim 1.

11. The network of claim 10 in which:

the generating includes assigning a fitness value to each of the plurality of symbol strings depending on the evaluations; and the genetic algorithm generates symbol strings depending on the fitness values;

the neural networks include a layer of input neurons, a layer of output neurons, one or more hidden layers of neurons between the input layer and the output layer, a plurality of signal transmission paths interconnecting the neurons, the neurons multiplying signals received from the transmission paths by a weight for each path, the weight being adjusted during the training;

the neural network architectural parameters include: the number of layers of hidden neurons; and the number of neurons within each hidden layer of the network;

the network is a feed foreword, wherein signals between neurons are only propagated in a direction toward the output layer; the learning method includes back propagation; and the learning method parameters include, learning rate, momentum, and initial path weight information;

the genetic algorithm selects less than all the symbol strings of the population for use in generating the further population, the selection depending on results of the evaluating;

the genetic algorithm copies some of the symbols from one symbol string to another symbol string to generate the further population;

the genetic algorithm randomly changes values of symbols in the symbol strings of the population to generate the further population; and the training includes applying the inputs of a training set to a neural network; comparing the resulting output from the neural network to the outputs of the training set; and updating link weights within the neural network depending on results of the comparing.

12. The method of claim 1 in which the symbols of the symbol strings include information representing parameters of a supervised learning method.

13. The method of claim 1 in which the symbols of the symbol strings represent parameters of a back propagation type learning method.

14. The method of claim 13 in which learning parameters include information for determining a learning rate.

15. The method of claim 13 in which learning parameters include information for determining a learning momentum.

16. The method of claim 13 in which learning parameters include information for determining initial path weights.

17. The method of claim 1 in which:

the generating includes assigning a fitness value to each of the plurality of symbol strings depending on the evaluations; and the genetic algorithm generates symbol strings depending on the fitness values;

the neural networks include a layer of input neurons, a layer of output neurons, one or more hidden layers of neurons between the input layer and the output layer, a plurality of signal transmission paths interconnecting the neurons, the neurons multiplying signals received from the transmission paths by a weight for each path, the weight being adjusted during the training;

the neural network architectural parameters include: the number of layers of hidden neurons; and the number of neurons within each hidden layer of the network;

the network is a feed foreword, wherein signals between neurons are only propagated in a direction toward the output layer; the learning method includes back propagation; and the learning method parameters include, learning rate, momentum, and initial path weight information;

the genetic algorithm selects less than all the symbol strings of the population for use in generating the further population, the selection depending on results of the evaluating;

the genetic algorithm copies some of the symbols from one symbol string to another symbol string to generate the further population;

the genetic algorithm randomly changes values of symbols in the symbol strings of the population to generate the further population; and the training includes applying the inputs of a training set to a neural network; comparing the resulting output from the neural network to the outputs of the training set; and updating link weights within the neural network depending on results of the comparing.

18. A system for producing optimized artificial neural networks, comprising:

means for providing a plurality of different neural network input-output sets including a plurality of training sets and an evaluation set;

means for providing an initial population of multiple symbol strings, the symbols of the strings representing parameters of neural network architecture and parameters of a learning method;

means for providing artificial neural networks for respective symbol strings of the population, based on the neural network architecture parameters;

training the artificial neural networks using the learning method depending on the training sets and learning method parameters;

means for evaluating the trained neural networks using the evaluation set to generate evaluations of the trained neural networks;

means for generating a further population of multiple symbol strings from the population of symbol strings using a genetic algorithm depending on the evaluations; and means for selecting one of the symbol strings for producing the optimized artificial neural network depending on the evaluations.

19. The system of claim 18 in which:

the generating includes assigning a fitness value to each of the plurality of symbol strings depending on the evaluations; and the genetic algorithm generates symbol strings depending on the fitness values;

the neural networks include a layer of input neurons, a layer of output neurons, one or more hidden layers of neurons between the input layer and the output layer, a plurality of signal transmission paths interconnecting the neurons, the neurons multiplying signals received from the transmission paths by a weight for each path, the weight being adjusted during the training;

the neural network architectural parameters include: the number of layers of hidden neurons; and the number of neurons within each hidden layer of the network;

the network is a feed foreword, wherein signals between neurons are only propagated in a direction toward the output layer; the learning method includes back propagation; and the learning method parameters include, learning rate, momentum, and initial path weight information;

the genetic algorithm selects less than all the symbol strings of the population for use in generating the further population, the selection depending on results of the evaluating;

the genetic algorithm copies some of the symbols from one symbol string to another symbol string to generate the further population;

the genetic algorithm randomly changes values of symbols in the symbol strings of the population to generate the further population; and the training includes applying the inputs of a training set to a neural network; comparing the resulting output from the neural network to the outputs of the training set; and updating link weights within the neural network depending on results of the comparing.

20. A method for selecting an architecture of an artificial neural network, the method comprising the steps of
   a) choosing a population of symbol strings, each symbol string representing a respective neural network architecture including a plurality of neurons, which population has at least two members;
   b) for each symbol string,
      i) providing a set of neural network inputs including a training set and an evaluation set, which evaluation set is not identical to the training set;
      ii) training the respective neural network using the training set of inputs;
      iii) evaluating the trained neural network using the evaluation set of inputs;
   c) modifying the population according to a true genetic algorithm, based on results of the evaluating step, and repeating b), until a stopping criterion is reached;
   d) choosing a symbol string representing the selected architecture from the population after the stopping criterion is reached;

further comprising the step of selecting the fittest, from among a plurality of networks which have undergone a training and evaluation step, according to a defined criterion;

wherein the step of modifying is carried out on the symbol strings representing the selected fittest networks;

wherein the symbol string includes a representation of the number of layers of hidden neurons, and the number of neurons within each layer of the network; and wherein the training step is carried out by back propagation and the symbol string further represents back propagation parameters of learning rate, momentum and dispersion of initial link weights.

21. A method for selecting a detailed architecture of an artificial neural network, the method comprising the steps of
   a) choosing a population of symbol strings, each symbol string representing a respective neural network architecture including a plurality of neurons, which population has at least two members, wherein each symbol string includes a representation of a number of neurons and how the neurons are connected,
   b) for each symbol string,
      i) providing a set of neural network inputs including a training set and an evaluation set, which evaluation set is not identical to the training set,
      ii) training the neural network using the training set of inputs,
      iii) evaluating the trained neural network using the evaluation set of inputs,
   c) modifying the population according to a true genetic algorithm, based on results of the evaluating step, and repeating b) until a stopping criterion is reached, and
   d) choosing a symbol string representing the selected architecture from among the population after the stopping criterion is reached,
   wherein the symbol string includes a representation of the number of layers of hidden neurons, and the number of neurons within each hidden layer of the network, and
   wherein the training step is carried out by back propagation, and the symbol string further represents back propagation parameters of learning rate, momentum, and dispersion of initial link weights.

* * * * *